United States Patent [19]

Carau, Sr. et al.

[11] 4,314,096
[45] Feb. 2, 1982

[54] PRE-LOAD APPARATUS AND METHOD FOR TRAVELLING WAVE DIGITIZER

[75] Inventors: Frank P. Carau, Sr.; Henry T. Hetzel; Michael A. Tremblay, all of Loveland, Colo.

[73] Assignee: Hewlett-Packard Company, Palo Alto, Calif.

[21] Appl. No.: 181,294

[22] Filed: Aug. 25, 1980

Related U.S. Application Data

[60] Division of Ser. No. 69,956, Aug. 27, 1979, abandoned, which is a continuation of Ser. No. 944,931, Sep. 22, 1978, Pat. No. 4,255,617.

[51] Int. Cl.³ .................................................. G08C 21/00
[52] U.S. Cl. ........................................................... 178/19
[58] Field of Search ................................. 178/18, 19; 340/146.3 SY; 33/1 M; 346/139 C Primary Examiner—Thomas A. Robinson
Attorney, Agent, or Firm—Edward L. Miller

[57] ABSTRACT

A digitizer propagates coarse and fine wavelength electric fields across a platen to perform phase delay measurements, the results of which correspond to a displacement of a cursor along a measurement axis. The time interval between propagating the longer wavelength coarse electric field at a high velocity and subsequently establishing and propagating a shorter wavelength fine electric field at a low velocity is minimized by pre-loading at high speed a propagation circuit with the pattern to be propagated as the shorter wavelength fine electric field.

4 Claims, 3 Drawing Figures

SIMPLIFIED BLOCK DIAGRAM

SIMPLIFIED BLOCK DIAGRAM

DETAILED BLOCK DIAGRAM

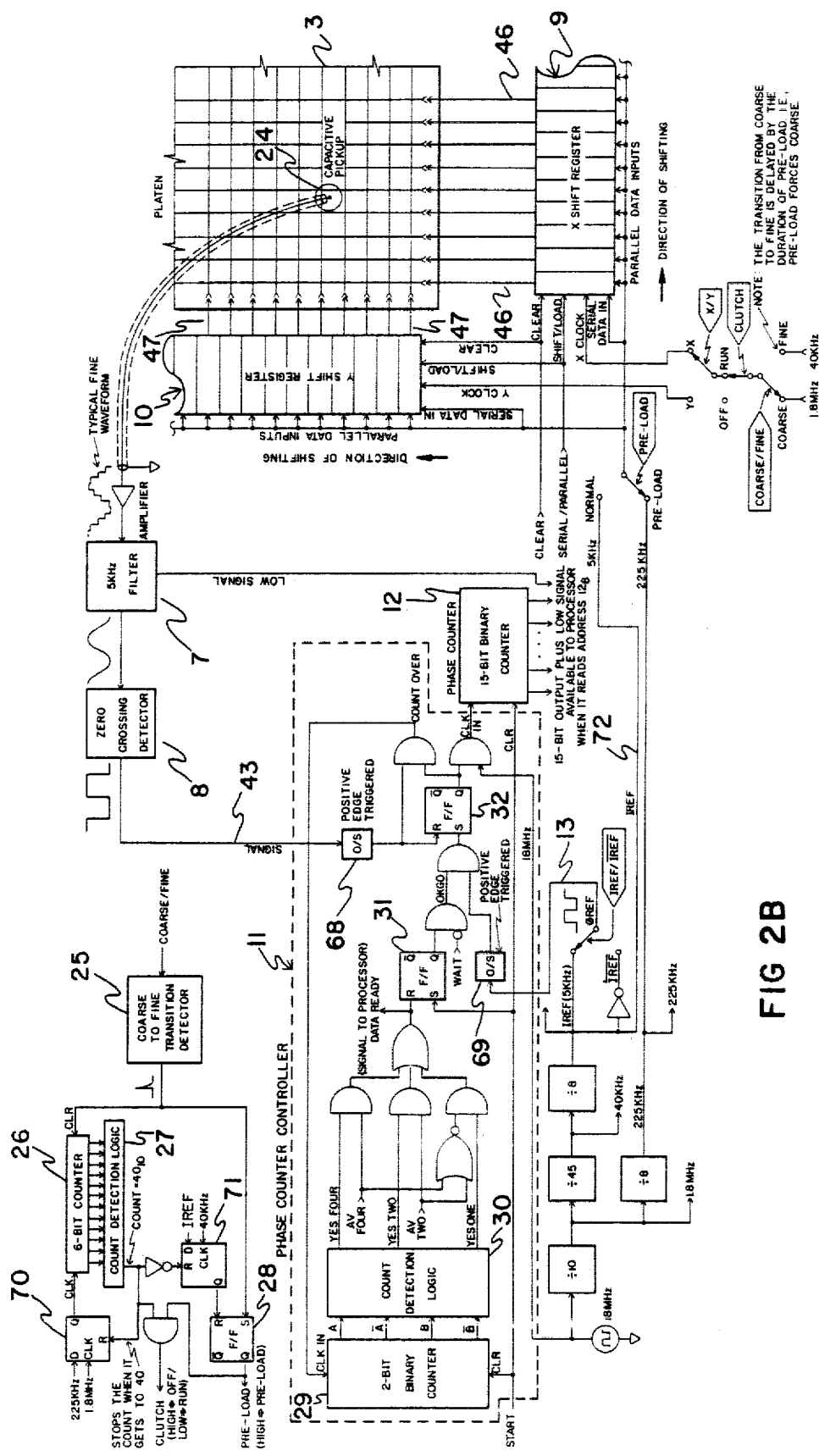

PRE-LOAD APPARATUS AND METHOD FOR TRAVELLING WAVE DIGITIZER

REFERENCE TO RELATED APPLICATION

This application is a division of an earlier filed copending application entitled TRAVELLING WAVE DIGITIZER, Ser. No. 69,956, filed on Aug. 27, 1979, by Frank Paul Carau, Sr., Henry T. Hetzel and Michael A. Tremblay, and assigned to the Hewlett-Packard Co., which application is in turn a continuation of an earlier filed copending application, now abandoned, of the same title and of the same inventors, Ser. No. 944,931, filed on Sept. 22, 1978, and also assigned to the Hewlett-Packard Co.

The present application deals with a portion of the subject matter disclosed in TRAVELLING WAVE DIGITIZER, Ser. No. 69,956, Aug. 27, 1979, which is hereby incorporated by reference. The continuation issued as U.S. Pat. No. 4,255,617 on Mar. 10, 1981.

BACKGROUND AND SUMMARY OF THE INVENTION

This invention relates to digitizers such as, or similar to, the digitizer disclosed in the aforementioned TRAVELLING WAVE DIGITIZER. That digitizer performs coarse and fine measurements by propagating an electrical bit pattern across a grid of conductors embedded in a platen. The coarse measurement involves propagating a long bit pattern at high speed; fine measurements require propagating a short bit pattern at low speed. Before a fine measurement can begin the remnants of the previous coarse or any other bit pattern must be entirely replaced by the fine bit pattern's propagation across the entire platen. This can take a significant amount of time, since the fine bit pattern is propagated at a slow speed. Furthermore, the longer the platen, the longer is the time required.

It is desirable to perform coarse/fine or fine/coarse measurement pairs as near together in time as possible, to reduce the effects of cursor motion and preserve the validity of the measurements. That is, if too wide a separation in time occurs between a coarse and fine measurement, the fine measurement might not reflect the fine location within the proper coarse interval, due to movement of the cursor between the measurements.

This difficulty can be avoided by ensuring that there is a minimum of time between coarse/fine or fine/coarse measurements. The present invention achieves this by rapidly shifting the fine bit pattern into place, and then shifting it at its proper slow speed. This minimizes the time required to begin a fine measurement.

DESCRIPTION OF THE PREFERRED EMBODIMENT

Figure 1:
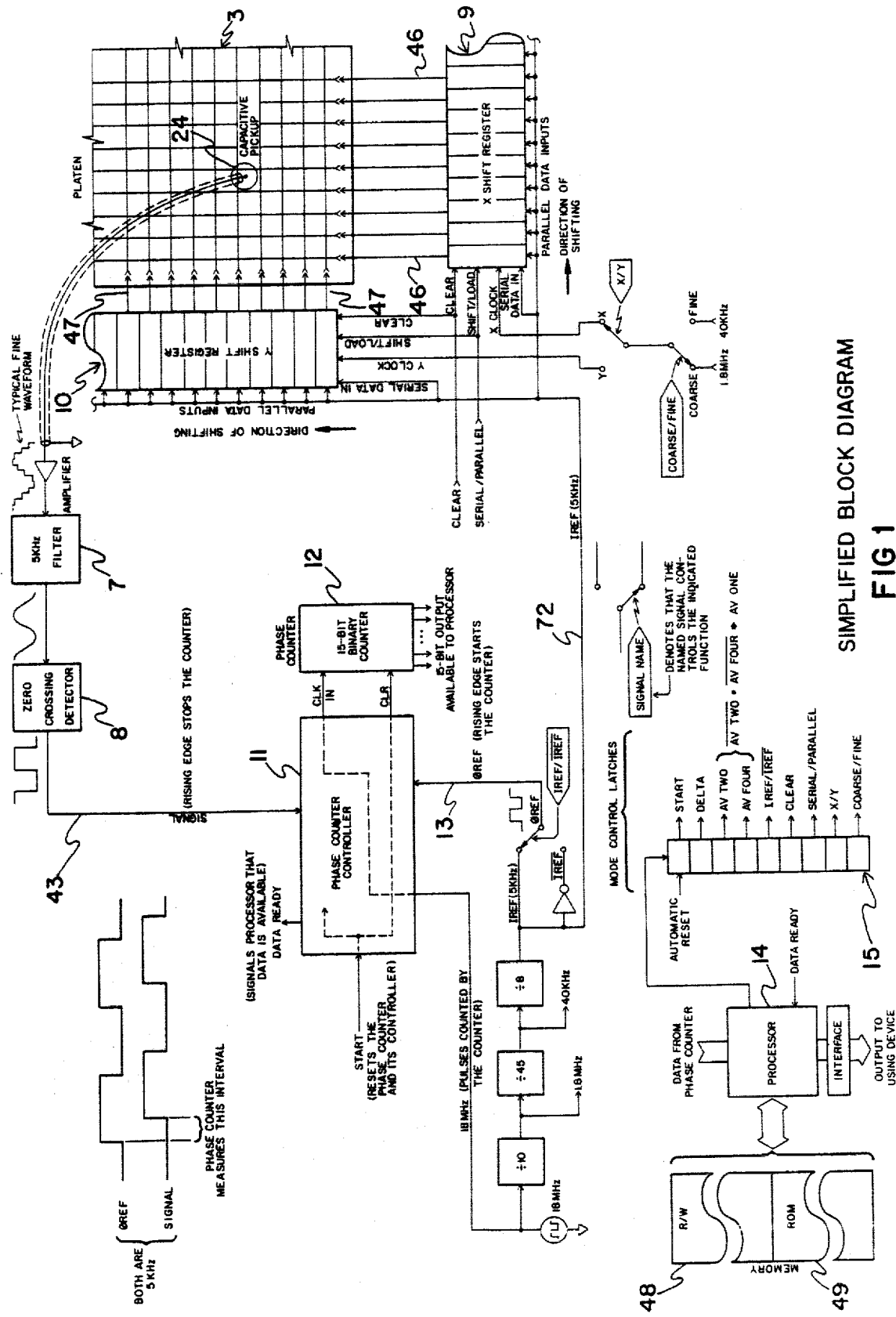
FIG. 1 is a simplified block diagram of a digitizer of the type to which the invention is applicable.

Referring to the simplified block diagram of FIG. 1, there now follows a brief description outlining the functions of the major elements of the digitizer.

Consider measurement in the x dimension. A platen 3 containing uniformly spaced (5 mm) parallel conductors 46, collectively called the x grid, provides a physical embodiment across which a symmetrically varying electrostatic field is impressed. The field is generated by the outputs from the x shift register 9, and corresponds to the instantaneous bit pattern in the shift register. The bit pattern is generated by applying a 5 kHz square wave signal 72, named IREF (Internal Reference), to the serial data input of the x shift register as it is shifting. If, for example, the shift rate were 1.8 MHz (as it is during coarse position measurements) the resulting bit pattern in the x shift register would be 180 bits set followed by 180 bits cleared.

A bit pattern in the x shift register causes a corresponding electro-static field having half-wave symmetry to appear at the platen. Since the conductor 46 in the x grid are parallel to the y axis, the electro-static field is uniform in the y direction. The value of the field in the x direction is a function of time and the bit pattern in the x shift register. The regular shifting of the x shift register causes the corresponding electro-static field to change its position on the platen; that is, it moves in the direction defined by the x axis.

The moving electro-static field passes under the cursor, whose essential element is a capacitive pickup 24. The capacitive coupling between the pickup 24 and the wires 46 of the x grid couples a signal to the cursor. The signal is a 5 kHz ac voltage which is subsequently amplified and applied to a 5 KHz filter 7. (The cursor signal is 5 KHz because that is the rate at which the signal originating the bit pattern at the input end of the x shift register is changing. Since the shift rate is a synchronized multiple of that 5 KHz, that is also then the rate at which the electro-static field in the platen varies as it moves past a given point.) The filter 7 removes the staircase nature of the coupled cursor signal and renders it purely sinusoidal. The output of the filter is converted back into a square wave 43, named SIGNAL, by a zero crossing detector 8.

The position along the x axis of the pickup 24 is reflected in the time required for a given leading edge of the electro-static square wave on the platen to traverse the distance from the edge of the platen to the location of the pickup.

A time interval corresponding to the one described above is measured by the phase counter 12 and its controller 11. The phase counter controller 11 is a means of starting and stopping the binary phase counter 12 according to the leading edges of $\phi$REF and SIGNAL. A leading edge of $\phi$REF starts the counter, which then counts cycles of an 18 MHz clock. The next leading edge of SIGNAL causes the counting to cease. A DATA READY line signals a micro processor 14 that the phase counter has data available.

The determination of the final value of the x coordinate requires an additional type of measurement, viz., x fine. To perform the x fine measurement the shift rate of the x shift register is changed from 1.8 MHz to 40 kHz. The use of IREF as a 5 kHz source of the serially shifted waveform/bit pattern remains unchanged. The slower shift rate produces a shorter bit pattern to represent the 5 kHz IREF. In particular, the bit pattern will be four bits set followed by four bits cleared.

The shorter bit pattern produces correspondingly shorter moving electro-static square waves on the platen. Whereas in the case of coarse measurement one wavelength exceeded the maximum length of the platen, the wavelength of a fine wave is considerably shorter than the platen. That is, there will be several cycles of fine waves on the platen, and any of several cursor positions (i.e., at intervals of one fine wavelength) will produce the same result in the phase counter.

This does not cause a problem, and results in an overall increase in the resolution of the x coordinate. The multiplicity is resolved as follows. The coarse measurement can be examined to determine which of the fine cycles contains the cursor location. Then the coarse measurement can be converted to an equivalent integral number of fine cycles, which is then augmented by the fine measurement.

The procedure outlined for x dimension measurement is analogous to the one used for measurement in the y dimension. Here is how the two activities are coordinated. The series of x measurements is performed first. To do this, both the x and y shift registers are first cleared. Then the x shift register is allowed to begin shifting at the coarse rate. The y shift register remains cleared. This is important, because it prevents any y direction cursor motion from crossing an electro-static gradient presented by the y shift register, and thereby coupling an unwanted component into the cursor signal. The x coarse measurement is followed by x fine, which is performed by changing the shift frequency of the x shift register.

Prior to beginning the y dimension measurements, both shift registers are again cleared. Now the x shift register remains cleared while the y shift register begins shifting at the fine rate. After the y fine measurement there follows y coarse. Then the entire coordinate measurement sequence starts over.

The measurement procedure outlined above does not employ simply single instances of phase counter activity to obtain each of the successive values. Instead, they are each averaged from successive measurements allowed to accumulate in the phase counter.

The digitizer incorporates a processor 14 that is responsible for directing all internal digitizer activity. Associated with the processor is both Read-Write memory 48 (R/W) and Read-Only-Memory 49 (ROM). The primary means by which the processor exercises its control is through the mode control latches 15. Through means described in detail in subsequent sections, the processor continuously manages the values of these latches. The latches, in turn, affect the interconnections between the various circuit elements described in reference to FIG. 1 thus far.

The START latch is used to inform the phase counter controller 11 that a new measurement is to begin. It also causes the phase counter 12 and its controller to be cleared. The START latch is automatically reset after a suitable period of time.

The DELTA latch is used to trigger a delay one shot that withholds the start of phase counter activity until various circuit conditions have had time to stabilize. DELTA ensures that the bit pattern in the active shift register has achieved uniformity, and that the filter has had time to settle after seeing a change in the cursor signal. DELTA is issued at the start of each different type of measurement.

The AV TWO latch tells the phase counter controller 11 to accumulate two consecutive individual measurements into the phase counter 12. AV TWO is not utilized in the present embodiment.

The AV FOUR latch tells the phase counter controller 11 to accumulate four consecutive individual measurements into the phase counter 12. AV FOUR is used in obtaining values that are later averaged by the processor.

The absence of both AV TWO and AV FOUR at the time START is issued implies an AV ONE to the phase counter controller 11. An AV ONE tells the phase counter controller to perform a single individual phase counter measurement.

The IREF/$\overline{\text{IREF}}$ latch controls a half-phase offset of $\phi$REF, and is dynamically adjusted by the processor 14 at the start of individual AV ONE's or AV FOUR's, to avoid ambiguity in combining coarse and fine measurements.

The X/Y latch designates which of the x shift register 9 or y shift register 10 will be the active shift register.

The CLEAR latch clears both the x and y shift registers.

The SERIAL/PARALLEL latch controls whether the shift register selected by the X/Y latch will shift IREF in as serial data for either of coarse or fine measurement, or parallel load IREF (for a reference measurement, described in TRAVELLING WAVE DIGITIZER).

The COARSE/FINE latch specifies the shift rate of the active shift register identified by the X/Y latch.

The processor controls the values of these latches during the coordinate measurement sequence according to programmed algorithms encoded in the ROM 49.

Figure 2A:
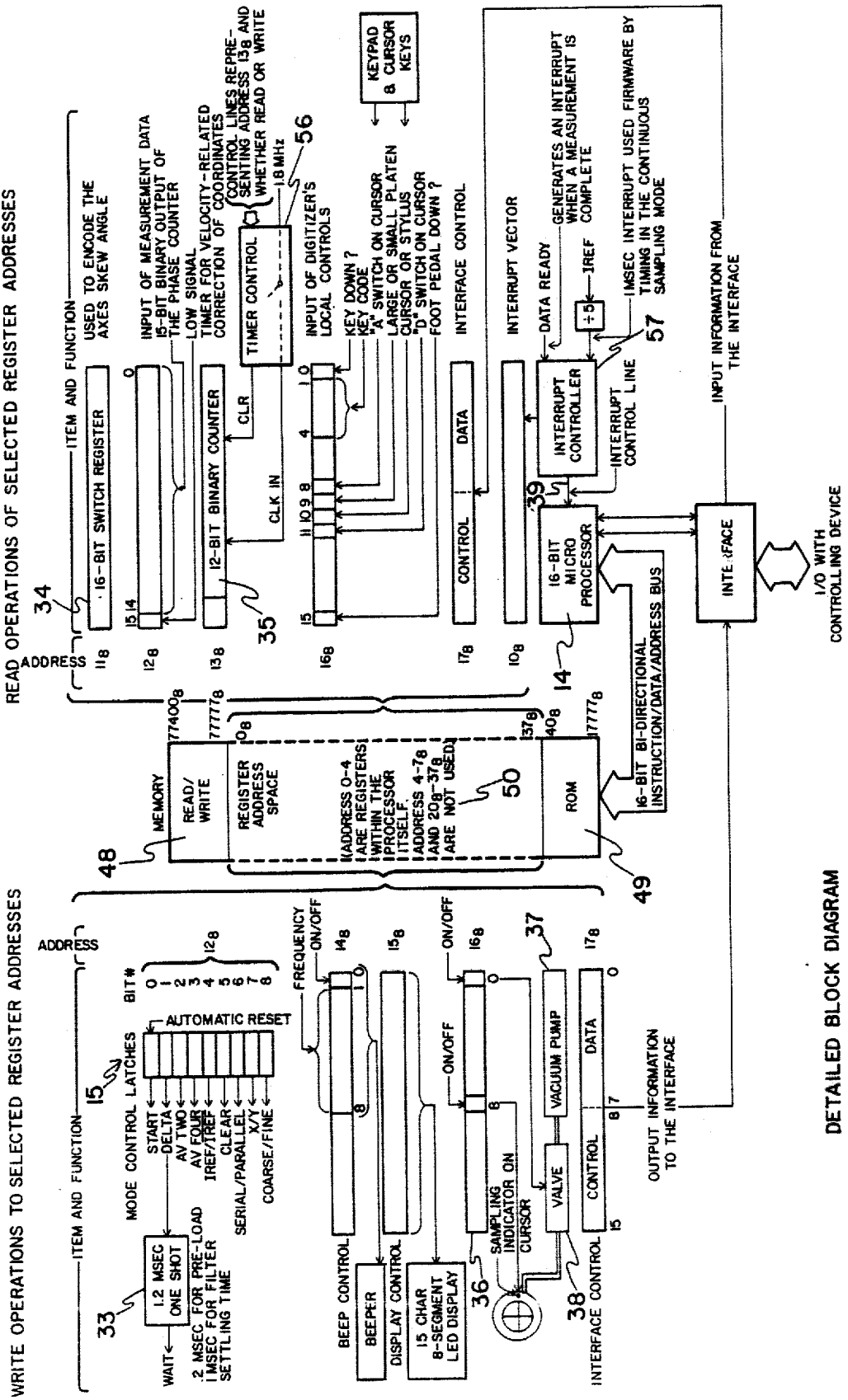
FIG. 2 A-B is a detailed block diagram of the digitizer of FIG. 1, and illustrates a preferred embodiment of the invention.

A more complete understanding of the operation of the digitizer may be had with reference to the detailed block diagram of FIGS. 2A and 2B. Recalling for a moment the simplified block diagram of FIG. 1, the latter is essentially a subset of FIGS. 2A and 2B. What was said relating to FIG. 1 is applicable to that part of FIG. 2B that is the same as FIG. 1, and will not be repeated.

As previously mentioned, the digitizer contains a processor that directs the internal operation of the digitizer's measurement apparatus; it also performs various error reduction procedures. With respect to both of these functions, no particular processor or type of processor need be used.

Referring now to FIG. 2A, a 16-bit micro-processor 14 operates in conjunction with a memory that is divided into a Read/Write (R/W) address space 48, a register address space 50, and a Read-Only Memory (ROM) address space 49. Of particular interest is the nature of the register address space 50. It exists between addresses 0 and $37_8$, inclusive.

To provide a means for the rest of the digitizer and the processor to communicate with each other, the digitizer incorporates hardware that responds as memory to selected addresses within the register address space. Under this scheme the processor performs an input operation when it reads one of those "memory locations," and performs an output operation when it writes to one of those "memory locations." The processor controls internal digitizer operation in part by inputting data from the phase counter, as well as status information concerning the digitizer's controls, such as from the keypad and the cursor. It further controls the digitizer by outputting information that sets up the mode control latches, as well as outputting other information for other purposes.

The various input operations of interest are briefly summarized below:

A read-from-memory operation directed to address $12_8$ obtains fifteen bits of phase counter data from the phase counter 12, and one bit of low signal (or not) information from the filter 7.

A read-from-memory operation directed to address 16₈ obtains status information concerning the digitizer's local controls, such as the keys on the cursor and on the keypad. This information is encoded as shown in FIG. 2A.

A read-from-memory operation directed to address 17₈ reads a byte of data sent to the digitizer from its controlling device.

The various output operations of interest are briefly summarized below:

A write-to-memory operation directed to address 12₈ establishes the values of the mode control latches 15.

A write-to-memory operation directed to address 17₈ sends a byte of data to the device controlling the digitizer.

Recalling the function and the purpose of the phase counter controller 11 of FIG. 1, this circuitry is shown in expanded form in FIG. 2B. Referring now to FIG. 2B, the phase counter controller incorporates a flip-flop 32 to control whether or not the phase counter 12 actually counts (at the 18 MHz rate). When the flip-flop 32 is set counting may proceed. If conditions are met for taking a measurement, or accumulating an additional measurement, the signal OKGO will be true and the next rising edge of OREF will then trigger a one shot 69, which sets flip-flop 32 and starts the phase counter. The next rising edge of SIGNAL 43 (the output of the zero crossing detector) will trigger a one shot 68 which resets flip-flop 32 and halts the phase counter.

The basic sequence of events just described is used as part of an AV ONE, AV TWO or AV FOUR related measurement. The mode control latches will have previously specified which type of operation is to be performed. What is needed is circuitry to implement the specified number of accumulations to the phase counter. This is achieved as follows.

Each time flip-flop 32 terminates either, (i) an on-going new count or (ii) an accumulation to an old count in the phase counter, the signal COUNT OVER increments a binary counter 29 that keeps track of the number of count intervals thus far accumulated. When a count detection circuit 30 produces an output that matches either AV TWO or AV FOUR, or matches their "NOR" (which specifies an AV ONE), the signal DATA READY is generated. This signals the processor 14 that the desired number of time interval measurements have been accumulated in the phase counter 12.

DATA READY also resets a flip-flop 31, which ensures that OKGO becomes false. Without OKGO φREF cannot restart the phase counter. The count in the phase counter remains unchanged until the processor sets the mode control latch called START. START appears at the beginning of each AV ONE, AV TWO or AV FOUR related measurement. What START does is clear the 2-bit binary counter 29 that registers the number of counts thus far accumulated, clear the phase counter, and set the flip-flop 31. Setting flip-flop 31 generates OKGO, provded WAIT is false. Assuming WAIT to be false, the next φREF will start the next instance of the entire phase counter sequence described thus far. The START mode control latch is automatically reset by the hardware a short time after it is set.

WAIT is the output of a 1.2 msec one shot 33 (see FIG. 2A) that is triggered by the mode control latch called DELTA. DELTA is issued whenever the filter may need settling time. That occurs at the beginning of each major type of measurement such as x coarse, x fine, etc. What WAIT does is hold OKGO false until the settling time is over. Once OKGO is again true (i.e., after WAIT goes false) the next φREF will initiate the measurement.

Operating in conjunction with the DELTA/WAIT-/OKGO mechanism just described is a collection of circuitry that generates a sigal called PRE-LOAD (see FIG. 2B). Its function is as follows. To begin an x fine or y fine measurement a new bit pattern must propagate its way down the active shift register. The same is true of coarse measurements also, but the coarse shift rate of 1.8 MHz is sufficiently rapid that no appreciable delay is seen in shift register set-up. However, the normal fine shift rate is only 40 kHz. This means that there can be an appreciable amount of time required to get the proper four-bits-set/four-bits-cleared bit pattern propagated all the way down to the end of the active shift register, especially if a large platen (with its correspondingly long shift register) is in use. To minimize the time required to shift in the fine bit pattern, and thereby keep the coordinate sampling rate at its maximum, the following procedure is employed.

At the beginning of a fine measurement the normal fine shift rate of 40 kHz is temporarily replaced with 1.8 MHz. In order to generate the proper bit pattern of four-bits-set/four-bits-cleared, the serial data input is simultaneously switched from 5 kHz to 225 kHz. This condition is maintained until the longest permitted shift register would be filled with the newly propagated bit pattern. It has been determined that a length equal to forty fine wavelengths will be the longest active dimension of any platen. Since each cycle of the 225 kHz now corresponds to a fine wavelength of four-bits-set/four-bits-cleared, it is sufficient to maintain the pre-load condition for forty cycles of the 225 kHz.

PRE-LOAD is true until the 6-bit binary counter 26 counts forty cycles of the 225 kHz. A D-type latch 70 ensures that the cycles of the 225 kHz pre-load data frequency are counted in synchronization with the 1.8 MHz pre-load shift frequency. A count detection circuit 27 detects the count of forty and eventually makes PRE-LOAD false by allowing the resetting of flip-flop 28 via the D-type latch 71. What the latch 71 does is this. First, it prevents the reset of flip-flop 28 until the count in the counter 26 has reached forty. Second, it delays the reset of flip-flop 28 until the normal shift frequency and the normal fine data frequency (which is IREF) are synchronized. Furthermore, this synchronization is of the same type that occurred between the 1.8 MHz and the 225 kHz. By performing such synchronization the change from PRE-LOAD to NORMAL will not disturb the four-bits-set/four-bits-cleared sequence being shifted into the shift register. To do so would defeat the very purpose of the pre-load operation.

During the interval between when the count in counter 26 reaches forty and when PRE-LOAD goes false the signal CLUTCH is true. What CLUTCH does is disconnect the active shift register from the 1.8 MHz pre-load shift frequency. This preserves the pre-loaded bit pattern in the active shift register until PRE-LOAD goes false and normal 40 kHz shifting is resumed.

Normal fine shift operation resumes as soon as PRE-LOAD goes false. Approximately 178 μsec are required for the counter 26 to count to forty. For the sake of extra margin, PRE-LOAD is assumed to last approximately 200 μsec.

Note that DELTA always accompanies a pre-load condition. Now consider the 1.2 msec period (WAIT) of the one shot 33 triggered by DELTA. The first 200 μsec of that 1.2 msec are to allow time for the pre-load cycle just described to occur. The remaining one millisecond is filter settling time for the new 5 kHz fine signal being coupled into the cursor.

The operational aspects of the phase counter control circuitry. 11, and of the pre-load circuitry described above, could be obtained through a number of different methods. They could, for instance, be obtained through the use of a state machine. Any scheme that preserves the attributes, as described, of the following signals would function in the place of the example circuits shown in FIGS. 2A and 2B. The important signals are: START, AV TWO, AV FOUR, AV ONE (implied by the absence of both AV TWO and AV FOUR), WAIT, IREF, φREF, SIGNAL, DATA READY, CLUTCH, and PRE-LOAD.

What is claimed is:

1. A digitizer comprising:
   first reference signal means for producing a first reference signal at a first reference frequency;
   fine clock signal means for generating a fine clock signal having a fine clock frequency that is a multiple of the first reference frequency;
   coarse clock signal means for generating a coarse clock signal having a coarse clock frequency that is both a multiple of the first reference frequency and higher than the fine clock frequency;
   pre-load reference signal means for producing a pre-load reference signal at a pre-load reference frequency that is higher than the first reference frequency;
   pre-load clock signal generation means for generating a pre-load clock signal at pre-load clock frequency that is to the pre-load reference frequency as the fine clock frequency is to the first reference frequency;
   selection means receiving the first and pre-load reference signals and also receiving the coarse, fine and pre-load clock signals, for respectively producing at a reference output and at a clock output the first reference signal and the coarse clock signal during a first interval, the pre-load reference signal and the pre-load clock signal during a second interval, and the first reference signal and the fine clock signal during a third interval;
   control means coupled to the selection means, for preceding each third interval by a second interval, for terminating the second interval in synchronism with a selected transition in the pre-load reference signal, and for commencing the third interval in synchronism with a transition in the first reference signal corresponding to the selected transition in the pre-load reference signal;
   a platen including a grid of uniformly spaced parallel conductors; and
   propagation circuit means coupled to the reference output and to the clock output and also coupled to the uniformly spaced parallel conductors of the platen, for propagating across the platen at a rate of one conductor per cycle of the signal present at the clock output a field having transitions in intensity corresponding to transitions in the amplitude of the signal present at the reference output.

2. A method of propagating differing wavelength fields across a surface containing an ordered plurality of uniformly spaced parallel conductors, comprising the steps of:
   driving each conductor with a signal corresponding to the logical value of a bit in an ordered sequence of bits in one-to-one correspondence with the ordered plurality of conductors;
   shifting at a first rate along the ordered sequence of bits a first periodic pattern of consecutive logical ones and consecutive logical zeros to produce a first propagating field of a first wavelength;
   setting the ordered sequence of bits to a second periodic pattern of consecutive logical ones and consecutive logical zeros;
   shifting at a second rate along the ordered sequence of bits the second periodic pattern to produce a second propagating field of a second wavelength; and
   the setting step recited above being performed in less time than a bit in the ordered sequence requires to shift along the entire ordered sequence at the second rate.

3. The method of claim 2 wherein the second periodic pattern is shorter in combined number of consecutive logical ones and zeros than is the first periodic pattern, and wherein the step of shifting at the second rate shifts the ordered sequence of bits slower than does the step of shifting them at the first rate.

4. The method of claims 2 or 3 wherein the first and second periodic patterns are each symmetrical.

* * * * *